(12) United States Patent
Kiefl et al.

(10) Patent No.: US 12,268,227 B2
(45) Date of Patent: Apr. 8, 2025

(54) PRODUCTION OF FLAVOR CONCENTRATES BY OSMOSIS

(71) Applicant: SYMRISE AG, Holzminden (DE)

(72) Inventors: Johannes Kiefl, Holzminden (DE);
Claudia Utermöhle, Uslar (DE);
Stefan Brennecke, Halle (DE)

(73) Assignee: SYMRISE AG, Holzminden (DE)

( * ) Notice: Subject to any disclaimer, the term of this patent is extended or adjusted under 35 U.S.C. 154(b) by 1255 days.

(21) Appl. No.: 16/762,887

(22) PCT Filed: Nov. 9, 2017

(86) PCT No.: PCT/EP2017/078735
§ 371 (c)(1),
(2) Date: Mar. 4, 2021

(87) PCT Pub. No.: WO2019/091556
PCT Pub. Date: May 16, 2019

(65) Prior Publication Data
US 2021/0378275 A1  Dec. 9, 2021

(51) Int. Cl.
*A23L 27/10* (2016.01)
*A23F 3/16* (2006.01)
*A23F 5/24* (2006.01)
*A23L 19/00* (2016.01)
*B01D 61/00* (2006.01)

(52) U.S. Cl.
CPC ............. *A23L 27/11* (2016.08); *A23F 3/16* (2013.01); *A23F 5/24* (2013.01); *A23L 19/00* (2016.08); *B01D 61/0022* (2022.08)

(58) Field of Classification Search
CPC .......... A23L 27/11; A23L 27/29; A23L 27/10; A23L 27/00; A23L 19/00; A23F 3/16;
(Continued)

(56) References Cited

U.S. PATENT DOCUMENTS 3,132,947 A * 5/1964 Mahlmann ............. A23F 5/486
426/386
4,952,751 A   8/1990 Blume et al.
(Continued)

FOREIGN PATENT DOCUMENTS

DE  102015119154 A1 † 5/2017
DK    201770753 A1 † 10/2017
(Continued)

OTHER PUBLICATIONS

Machine translation of DK201770753A1 (Google Patents) (Year: 2017).*

(Continued)

*Primary Examiner* — Subbalakshmi Prakash
(74) *Attorney, Agent, or Firm* — MARSHALL, GERSTEIN & BORUN LLP (57) ABSTRACT

The present invention relates to a process for preparing of a food concentrate in which an aqueous starting solution from a foodstuff is concentrated by osmosis with a semi-permeable biomimetic membrane. In addition, the present invention relates to a food concentrate which can be produced by the process according to the invention, a food concentrate which is free of disturbing aroma components with an OAV (odour activity value) ≥1 and which does not contain any solvent additives. Furthermore, the present invention relates to the use of the food concentrates and products comprising the food concentrate according to the invention.

7 Claims, 4 Drawing Sheets

Structure aquaporin membrane (58) Field of Classification Search
CPC ....... A23F 5/24; B01D 69/144; B01D 61/002; B01D 71/56
USPC ......................................................... 426/387
See application file for complete search history.

(56) References Cited

U.S. PATENT DOCUMENTS

| | | |
|---|---|---|
| 2012/0152841 A1 | 6/2012 | Vissing et al. |
| 2016/0016127 A1 | 1/2016 | Mentzel et al. |
| 2017/0259217 A1 | 9/2017 | Montemagno et al. |

FOREIGN PATENT DOCUMENTS

| | | |
|---|---|---|
| EP | 0 082 284 A1 | 6/1983 |
| EP | 2 075 320 A1 | 7/2009 |
| JP | H05236876 A | 9/1993 |
| JP | H08215 A | 1/1996 |
| JP | 2001220594 A | 8/2001 |
| JP | 2003204757 A | 7/2003 |
| JP | 2010013510 A | 1/2010 |
| WO | WO-2014/108827 A1 | 7/2014 |
| WO | WO-2017/080852 A1 | 5/2017 |

OTHER PUBLICATIONS

Braddock, "Ultrafiltration and Reverse Osmosis Recovery of Limonene from Citrus Processing Waste Streams," Journal of Food Science, 47(3):946-948 (1982).
Habel et al., "Membrances, Aquaporin-Based Biomimetic Polymeric Mambrances: Approaches and Challenges,:" 5:307-351 (2015).
International Search Report and Written Opinion for Application No. PCT/EP2017/078735, dated Jan. 29, 2018.
Tang et al., "Desalination by Biomimetic Aquaporin Membranes: Review of Status and Prospects," Desalination 308:34-40 (2013).
Office Action (and English translation) from Chinese Application No. 201780096702.6 dated Oct. 10, 2022.
Watanabe et al., "Freeze Concentration of Some Foodstuffs Using Ice Nucleation-active Bacterial Cells Entrapped in Calcium Alginate Gel," Argic. Biol. Chem., 53(10):2731-2735 (1989).
Office Action (and English translation) from Chinese Application No. 201780096702.6 dated Jun. 30, 2023.
Office Action (and English translation) from Japanese Application No. 2020-525905 dated Apr. 3, 2021.
Office Action (and English translation) from Japanese Application No. 2020-525905 dated Jan. 13, 2022.
Office Action and Translation from European Application No. 17 808 345.7 dated Jun. 14, 2022.
Office Action and Translation from Japanese Application No. 2020-525905 dated Aug. 31, 2022.
Ianniciello et al., "evapeos® : The Green Future of Instant Coffee," pp. 1-4, 2014 ederna V.1.2.†
Yang Zhao et al., "Synthesis of robust and high-performanc aquaporin-based biomimetic membranes by interfacial polymerization-membrane preparation and RO performance characterization," pp. 422-428, Dec. 15, 2012, Journal of Membrane Science, vols. 423-424.†
Vogel, "The Aquaporin Inside™ Technology," pp. 1-37, Jun. 7, 2016†

\* cited by examiner
† cited by third party

Figure 1: Structure aquaporin membrane

Figure 2: Principle forward osmosis

Figure 3: Forward osmosis with aquaporin membrane in the example of a coffee extract

Figures 4a and 4b: Chromatogram comparison of a tea extract above and the re-diluted concentrate of the same tea extract below

Figure 5: Yellow peach: Sensory profiling of water phase and re-diluted concentrate from aquaporin membrane filtration

Figure 6: Strawberry: Sensory profiling of water phase and re-diluted concentrate from aquaporin membrane filtration

PRODUCTION OF FLAVOR CONCENTRATES BY OSMOSIS

CROSS-REFERENCE TO RELATED APPLICATIONS

This is a U.S. National Phase of International Application No. PCT/EP2017/078735, filed August Nov. 9, 2017.

FIELD OF THE INVENTION

The present invention relates to a process for the production of a food concentrate, a food concentrate that can be prepared by the process according to the invention, a food concentrate which is free of disturbing aroma components with an OAV (odour activity value) ≥1 and which does not contain any solvent additives, the use of the food concentrates as well as products comprising the food concentrate according to the invention.

STATE OF THE ART

Aromatic substances play a major role in numerous industrial processes. On the one hand, these are processes which are solely aimed at the extraction of aromatic substances in the form of essences from fruits, vegetables, spices, flowers and the like and, on the other hand, processes for the production or refinement of foodstuffs and luxury foods, in which the preservation of natural aromatic substances, such as fragrances and flavours, determines the quality of the products or makes these products edible, respectively.

The aroma originating from a specific source, e.g. a fruit, is not a chemically uniform substance, but is composed of a large number of different chemical components, which only in their entirety give the sensory result of the natural aroma of a foodstuff. Experience shows that when handling media containing aromatic substances or when processing food, there is a risk that parts of the natural mixture will be lost or are degraded and thus the natural content will be reduced or even destroyed, resulting in a so-called "off-flavour". This is particularly the case when solutions containing aromatic substances are concentrated.

In the production of vegetable and fruit juices as well as in the extraction of food, industrially significant amounts of odour and taste-intensive aqueous solutions are produced, which, when concentrated and added as a concentrate, re-aromatise the same food or aromatise other foods. For example, when fruit or vegetable juice concentrate is obtained, an aromatic vapour condensate is obtained. Thereby, freshly pressed fruit juices from stone, pome and soft fruit as well as juices from citrus and tropical fruits are concentrated by evaporation and thus preserved. During the evaporation process, volatile aromatic substances are extracted from the thin juice in the form of a vapour condensate, which is then concentrated. Before bottling, the fruit or vegetable juice concentrate is re-diluted and the previously separated aroma concentrate is added to the fruit or vegetable juice to reconstitute the aroma. Fruit or vegetable juice concentrate that is only one-sixth to one-eighth of its original volume saves storage and transportation costs. Another important application for evaporation technology in the juice industry is the concentration of extracts from a wide variety of starting materials. For example, juice residues and oils are extracted from the fruit pulp and the peel of citrus fruits, concentrated by evaporation, then separated and thereby further processed. Evaporation plants are also used in other areas of the beverage industry, for example in the brewing industry for concentrating malt extract, brewer's yeast, yeast extract and hop extract.

Re-diluted fruit or vegetable juices must be measured against the taste of freshly squeezed juices. Due to the increased consumer interest in authentic taste experience and health-conscious nutrition, existing processes for concentrating aqueous solutions can only be used to a limited extent.

For decades, aqueous solutions from foods having odour- and taste-active substances have been concentrated by means of distillative processes. Despite the use of gentle process parameters such as the use of vacuum to reduce the vapour pressures of the volatile components, disturbing flavour components can be formed and desired flavour components degraded even at temperatures of 30° C. Distillation, for example, can result in cooking notes due to the thermal load of the aqueous product, which cannot be considered an authentic taste experience. Upon concentration of strawberry vapour condensates cooking notes are created that remind the consumer of jam and not of the consumption of fresh strawberries.

A more recent process concerns the production of an aroma concentrate by adsorption of flavouring substances on solid phase material, as described for example in EP 2 075 320 A1. In the adsorptive concentration of aqueous solutions, as described for example in EP 0 082 284 A1, the aqueous solution is passed through a fill of a porous sorbent which is surface-modified with organic residues and the fill is then eluted with a small amount, compared to the aqueous solution, of an organic solvent. However, this process requires the use of solvents for desorption, such as methanol, which is considered toxicologically questionable. Another disadvantage of these state-of-the-art processes is that the selectivity of the adsorbent and the solvent for elution/desorption can shift the aroma profile.

The solvent-free and non-thermal concentration of odour and taste-intensive aqueous solutions has therefore concerned the food industry for quite some time. In particular, membrane-supported processes are being developed to separate water and enrich valuable components without using solvents. For example, a combination of ultrafiltration and reverse osmosis has been used to remove water from aqueous solutions from in citrus processing (Braddock, R. J. "Ultrafiltration and Reverse Osmosis Recovery of Limonene from Citrus Processing Waste Streams", Journal of Food Science, 1982, 47(3), 946-948). Thereby, hollow fibre flat membranes consisting of classical materials such as cellulose acetate, polysulfone and polytetrafluorethylene were used. In reverse osmosis, however, pressures of 10 to over 100 bar are usually used, which are generally known to cause the acceleration of degradation reactions, which has a negative effect on the sensory profile of the concentrates obtained.

WO 2017080852 A1 describes a membrane process for concentrating aqueous coffee extracts that are more sensorially reminiscent of freshly brewed coffee than instant coffees obtained by conventional evaporation, spray drying or freeze drying. Thereby, in addition to water, other substances with low molar mass, i.e. less than 1 kDa, penetrate the membrane such as small sensory active substances and are therefore lost. A high loss of aromatic substances, which usually have a molecular weight of 100-300 Da, is accepted in order to achieve a high permeation flow of 8.3 l/m²/h at 10-20 bar and thus rapid dewatering. The examples show that membranes made of conventional materials such as cellulose acetate, polysulfone, polyamide, polytetrafluoroethylene, etc. are unsuitable for concentrating aqueous solutions in a stable and cost-effective process without changing the aroma profile. Either the flux is too low to operate the process economically due to the low permeability or the transmembrane pressure is so high that the aroma is degraded or the good permeability results in a poor selectivity, which causes the aroma substances to be lost with the water.

Recently, biomimetic membranes interspersed with aquaporins have been on the market. Aquaporins are cell membrane-bound proteins that are widely spread in living organisms and, under certain conditions they form a water channel to allow water molecules to pass through and to retain dissolved inorganic and organic substances.

As described by Tang et al. "Desalination by biomimetic aquaporin membranes: Review of status and prospects", Desalination 308, 2013, aquaporins show a selective permeability in nature, e.g. towards water, glycerol or salts, whereas the function of the selectivity is still unclear in many respects. This is aggravated by the fact that industrial processing into membranes, such as recombinant production of AQPs and embedding in the membrane polymer, as well as process instability, reduce the performance of the membrane. Therefore, there is no teaching on the filterability of aqueous solutions with organic flavours and odour substances.

In WO 2014108827 A1, for example, it is described that aquaporin membranes can be used for the dialysis of blood, in particular for the separation of human metabolites such as urea, p-cresyl sulfate and peptides up to a molecular weight of 692 Da. However, there is no doctrine on the specific selective enrichment or depletion of organic flavours and odour substances to produce a flavour or aroma-generating preparation.

The aim of the present invention was to develop a process by which a food concentrate can be produced from an odour- and taste-active aqueous solution of a foodstuff without loss of these valuable flavours and odour substances, and maintaining the sensory profile of the initial sample.

DESCRIPTION OF THE INVENTION

The present problem is solved by the subject-matter of the independent claims. Preferred formulations result from the wording of the dependent claims and the following description.

A first subject of the present invention concerns a process for preparing a food concentrate, comprising the following steps:
  Preparation of an aqueous starting solution from a food,
  concentration of the aqueous starting solution by osmosis with a semi-permeable biomimetic membrane, and
  Formation of a food concentrate as retentate.

Another object of the present invention concerns a food concentrate which is obtainable or is obtained by the production process according to the above invention.

Furthermore, an object of the present invention concerns a food concentrate which is free from disturbing aroma components with an OAV (odour activity value) ≥1 and/or not containing any solvent additives.

Another aspect of the present invention concerns the use of the food concentrates according to the invention for aromatising or reconstituting the aroma of foods, beverage products, semi-finished products, oral hygiene products, cosmetic or pharmaceutical products.

Ultimately, the present invention concerns foods, beverage products, semi-finished products, oral hygiene products, cosmetic or pharmaceutical products which comprise the food concentrates according to the invention.

DETAILED DESCRIPTION OF THE INVENTION

In the process for the production of a food concentrate according to the invention, an aqueous starting solution is provided from a foodstuff in a first step.

Food is any substance or product that is intended to be ingested by humans whether processed, partially processed or unprocessed. Food also includes beverages and any substances, including water, that are intentionally added to the food during its manufacture or treatment or processing. Luxury foods are also assigned to food. Luxury foods in the narrower sense are foods that are not primarily consumed for their nutritional value and to satiety, but rather for their stimulating effect or their taste. Examples of luxury foods include coffee, tea, cocoa and spices. For the purposes of the invention, vegetable or fungal raw materials which are not suitable for direct consumption but are suitable for the production of aroma preparations and are commonly used are also considered as food.

The aqueous starring solution of a food is either a food which is naturally in an aqueous form, such as milk, an aqueous solution of a food which is obtained by adding water to a food, an aqueous extract of a food which is obtained by adding water to a food, such as edible plants, such as tea or coffee, or a direct juice from fruits or vegetables. An aqueous starting solution of a food also includes typical aqueous solutions obtained during the treatment or processing of a food, for example an aromatic vapour condensate obtained during the production of juice concentrates from fruit or vegetables by means of juice evaporation.

In order to produce a direct juice, ripe fruit or vegetables are first washed, selected and ground in a mill machinery or a milling machine into the so-called mash. If necessary, the mash is depectinised with special enzymes such as pectinases, cellulases and hemi-cellulases before further processing in order to achieve a better juice yield. Juicing then takes place in a press at a pressure of 5 to 20 bar or by centrifugation. The raw juice obtained in this way is depectinised, clarified and filtered before further processing into concentrate. In this case, the resulting juice is the aqueous starting solution, which comprises aroma and flavouring substances, and is used in the process according to the invention.

Alternatively, the raw juice can be processed into concentrate. Before further processing into concentrate, the juice must be depectinised, clarified and filtered. In addition to freeze concentration, the process of evaporation is used to produce juice concentrate. Concentration by evaporation generates a vapour condensate which contains the aroma and flavouring substances of the starting product and is used as an aqueous starting solution in the process according to the invention.

The aqueous starting solution is preferably obtained from fruit, a vegetable, herbs, spices, tea, coffee, animal-based foods such as meat or milk or alcoholic food such as beer or wine. A vapour condensate of fruit or vegetables as aqueous starting solution is even more preferred in the process according to the invention.

In the second step of the process according to the invention, the above-described aqueous starting solution from a food is concentrated by osmosis with a semi-permeable biomimetic membrane.

In the natural sciences, osmosis is the directed flow of molecular particles through a selective or semi-permeable separating layer or membrane. In particular, osmosis is described as the spontaneous passage of water or another solvent through a semi-permeable membrane that is permeable to the solvent but not to the substances dissolved in it.

The osmosis in the process according to the invention can be carried out as forward osmosis or as reverse osmosis at low pressure. Forward osmosis is preferred in the process according to the invention.

Reverse osmosis is a physical process for the concentration of substances dissolved in liquids, in which the natural osmosis process is reversed by pressure. The principle of action is that the medium, in which the concentration of a certain substance is to be reduced, is separated by a semi-permeable membrane from the medium in which the concentration is to be increased. This is subject to a pressure that must be higher than the pressure caused by the osmotic desire to balance the concentration. This allows the molecules of the solvent to migrate against their "natural" osmotic direction of propagation. The process pushes them into the compartment where dissolved substances are less concentrated.

Drinking water has an osmotic pressure of less than 2 bar, the applied pressure for reverse osmosis of drinking water is 3 to 30 bar, depending on the membrane used and plant configuration. The osmotic membrane, which only allows the carrier liquid (solvent) to pass through and retains the dissolved substances (solute), must be able to withstand these high pressures. If the pressure difference more than compensates for the osmotic gradient, the solvent molecules pass through the membrane like a filter, while the "impurity molecules" are retained. Unlike a classic membrane filter, osmosis membranes do not have continuous through-going pores. Instead, the ions and molecules migrate through the membrane by diffusing through the membrane material.

The osmotic pressure increases with increasing concentration difference. If the osmotic pressure equals the applied pressure, the process comes to a halt. An osmotic equilibrium then exists. A steady discharge of the concentrate can prevent this.

Forward osmosis is an osmotic process that uses a semi-permeable membrane to effect the separation of water from a solution containing dissolved substances. The driving force for this separation is an osmotic pressure gradient between a solution of high concentration (draw solution), often referred to as a "draw solution" and a solution of lower concentration, referred to as the "feed solution". An osmotic pressure gradient is used to induce a flow of water through the membrane into the solution of high concentration, thus effectively concentrating the solution of lower concentration.

In both reverse osmosis and forward osmosis, in the process according to the invention, water is extracted from the aqueous starting solution of a food by means of a biomimetic membrane, which is described in more detail below, so that a concentration of the aqueous starting solution follows.

Preferably, in the process according to the invention, the concentration of the aqueous starting solution is carried out using a biomimetic membrane as forward osmosis.

Even more preferred, the concentration of the aqueous starting solution is carried out with a biomimetic membrane as forward osmosis against an osmosis solution. For this purpose, the osmotically active solution (draw solution) is run in counter-current to the aqueous starting solution of the food, whereby the water is removed from the aqueous starting solution.

Normally, forward osmosis in the process according to the invention involves the use of osmosis solutions comprising one or more chemical component(s) from the following group: salts consisting of a cation selected from the group consisting of ammonium, sodium, potassium, calcium and magnesium; and an anion selected from the group consisting of acetate, chloride, citrate, hydrogen carbonate, formate, lactate, malate, propionate, sulfate, succinate and tartrate. In addition, salts of amino acids and simple sugars such as glucose, fructose and sucrose are used.

Solutions comprising NaCl, $MgCl_2$, KCl, K-lactate, $NH_4HCO_3$ or sucrose are preferably used as osmotically active solutions. In the process according to the invention, osmotic solutions comprising NaCl, K-lactate or sucrose are most preferred. An osmosis solution comprising NaCl is particularly preferred.

The osmosis solution used in the process according to the invention has an initial concentration of the chemical components in the range of 0.05 to 4 M, preferably in the range of 0.5 to 3 M.

The method according to the invention is characterized in that a semi-permeable biomimetic membrane is used in the step for concentrating the aqueous starting solution from a food by means of one of the osmosis processes described above. These biomimetic membranes are preferably those membranes described by Joachim Habel et al. in "Membranes "Aquaporin-based biomimetic polymeric membranes: approaches and challenges"; 2015, 5, 307-351; ISSM 2077-0375", in particular pages 312-319. The disclosure of the aquaporin-based biomimetic polymeric membranes described therein is fully incorporated into the present application by specific reference to the membranes disclosed therein.

Such biomimetic membranes, which are interspersed with aquaporins, are already commercially available. They are produced by the company Aquaporin A/S, Denmark, and sold under the trade name Aquaporin Inside R. Such aquaporin membranes are used for example in the dialysis of blood or the desalination of sea water.

The semi-permeable biomimetic aquaporin membranes used in the process according to the invention are characterized in that they comprise
    vesicles of liposomes or polymersomes, each of which has at least one aquaporin protein incorporated therein;
    a thin film composite matrix in which the vesicles are embedded; and
    a carrier layer.

Figure 1:
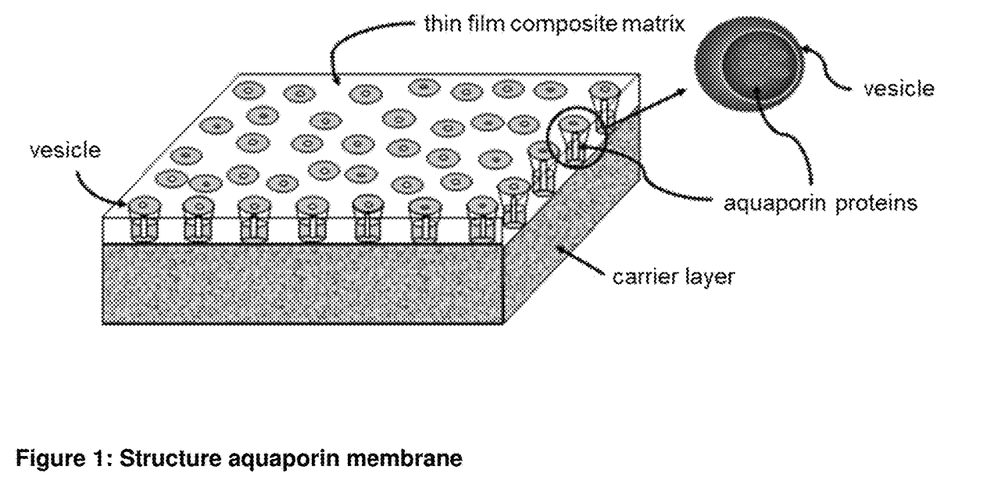
FIG. 1 is a schematic representation of the structure of an aquaporin membrane used according to the invention

The structure of the above described semi-permeable biomimetic aquaporin membrane is shown in FIG. 1.

As can be seen in FIG. 1, the aquaporin membrane in the active layer comprises vesicles in which aquaporins are incorporated. Aquaporins are cell membrane-bound proteins that are widespread in living organisms, which under certain conditions form a water channel to allow water molecules to pass through and to retain dissolved inorganic as well as organic substances in the cell. They are therefore also called water channels. In the aquaporin membrane, aquaporins form water channels that preferentially allow water molecules to pass, while the passage of other molecules is ideally blocked, regardless of their size, molecular weight and chemical structure.

The vesicle matrix consists of at least one liposome or at least one polymersome. The liposome comprises: lipids such as DPhPC, DOPC, mixed soybean lipids, asolectin or mixed lipids of *E. coli*. The polymersome comprises: triblock copolymers of the hydrophilic-hydrophobic-hydrophilic type (A-B-A, A-B-C, C-B-A, wherein A is PMOXA, B is PDMS and C is PEO), diblock copolymers of the hydrophilic-hydrophobic type (A-B, wherein A is PB and B is PEO) or combinations thereof.

The aquaporins preferably comprise, according to the invention, at least one protein selected from the group consisting of AQP0, AqpZ, SoPIP2, AQP10 and their isoforms. AQP0 is particularly preferred.

As can be seen further from FIG. 1, the vesicles containing the aquaporins are incorporated at the top of a thin film composite matrix. The thin film composite matrix is prepared by polymerizing an aqueous solution of an amine with a solution of an acid chloride in an organic solvent. The aquaporin-water channel-vesicles are incorporated into this aqueous solution.

The thin-film composite matrix is in turn applied to a porous carrier layer. The carrier layer is preferably a polyether sulfone.

The manufacture of these semi-permeable biomimetic membranes, further compositions and physical and chemical properties are described, for example, in WO 2014108827 A1, in particular pages 6 to 33, the disclosure of which is incorporated into the present application in its entirety by reference.

The following Table 1 lists exemplary compositions of such aquaporin membranes:

TABLE 1

Composition of aquaporin membranes

| Polymer | Membrane protein | Permeability |
|---|---|---|
| $PMOXA_{20}$-$PDMS_{41}$-$PMOXA_{20}$ | AQP0 | $H_2O$ |
| $PMOXA_{12}$-$PDMS_{54}$-$PMOXA_{12}$ | AqpZ | $H_2O$ |
| $PMOXA_8$-$PDMS_{55}$-$PMOXA_8$ | AqpZ | $H_2O$ |
| $PMOXA_{12}$-$PDMS_{55}$-$PMOXA_{12}$ | AQP0 | $H_2O$ |
| $PMOXA_{12}$-$PDMS_{55}$-$PMOXA_{12}$ | AqpZ | $H_2O$ |
| $PMOXA_8$-$PDMS_{60}$-$PMOXA_8$ | AqpZ | $H_2O$ |
| $PMOXA_{15}$-$PDMS_{68}$-$PMOXA_{15}$ | AqpZ | $H_2O$ |
| $PMOXA_{20}$-$PDMS_{75}$-$PMOXA_{20}$ | AqpZ | $H_2O$ |
| $PMOXA_{110}$-$PDMS_{40}$-$PEO_{25}$ | AQP0 | $H_2O$ |
| $PMOXA_{45}$-$PDMS_{40}$-$PMOXA_{67}$ | AQP0 | $H_2O$ |
| $PB_{12}$-$PEO_{10}$ | AQP0 | $H_2O$ |
| $PB_{12}$-$PEO_{10}$ | AqpZ | $H_2O$ |
| $PB_{12}$-$PEO_{10}$ | SoPIP2;1 | $H_2O$ |
| $PB_{22}$-$PEO_{14}$ | AQP0 | $H_2O$ |
| $PB_{22}$-$PEO_{23}$ | AqpZ | $H_2O$ |
| $PB_{22}$-$PEO_{23}$ | SoPIP2;1 | $H_2O$ |
| $PB_{29}$-$PEO_{16}$ | AQP10 | $H_2O$ |
| $PB_{35}$-$PEO_{14}$ | AqpZ | $H_2O$ |
| $PB_{35}$-$PEO_{14}$ | SoPIP2;1 | $H_2O$ |
| $PB_{43}$-$PEO_{32}$ | AQP10 | $H_2O$ |
| $PB_{46}$-$PEO_{30}$ | AqpZ | $H_2O$ |
| $PB_{46}$-$PEO_{32}$ | AQP10 | $H_2O$ |
| $PB_{92}$-$PEO_{78}$ | AQP10 | $H_2O$ |

Figure 2:
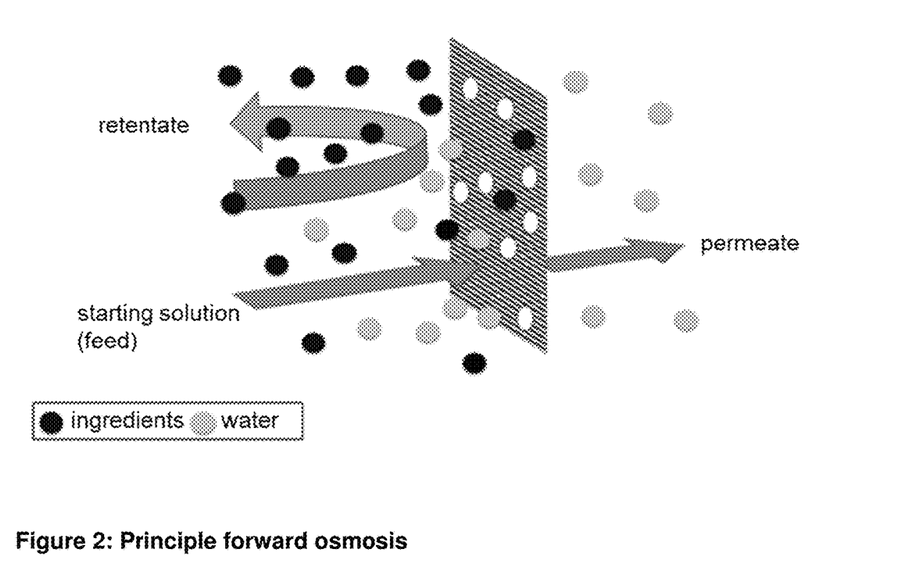
FIG. 2 is a schematic representation of the principle of forward osmosis

The functioning of the concentration of an aqueous starting solution from a food with a semi-permeable biomimetic aquaporin membrane by forward osmosis according to the invention is now described in more detail by reference to FIG. 2. In forward osmosis, the aqueous starting solution, which contains, for example, valuable aroma and flavour substances, is spatially separated from the osmosis solution by the semi-permeable biomimetic aquaporin membrane. The concentration of the osmosis solution is greater than the concentration of the starting solution. Due to the concentration gradient and the semi-permeable biomimetic aquaporin membrane, preferentially water molecules migrate from the starting solution through the aquaporin membrane to the osmosis solution, without applying pressure. The valuable aroma and flavour substances cannot pass through the semi-permeable biomimetic aquaporin membrane and thus remain in the retentate regardless of their size, molecular weight and chemical structure. The migration of the water molecules removes water from the starting solution, i.e. a food concentrate is produced as retentate, in which the valuable aroma and flavour substances are concentrated. The osmosis solution on the other hand is diluted due to the migration of water; a permeate is formed. To keep the osmosis system in equilibrium, on the one side the food concentrate is continuously drawn off from the system and on the other side fresh osmosis solution is continuously fed into the system.

Figure 3:
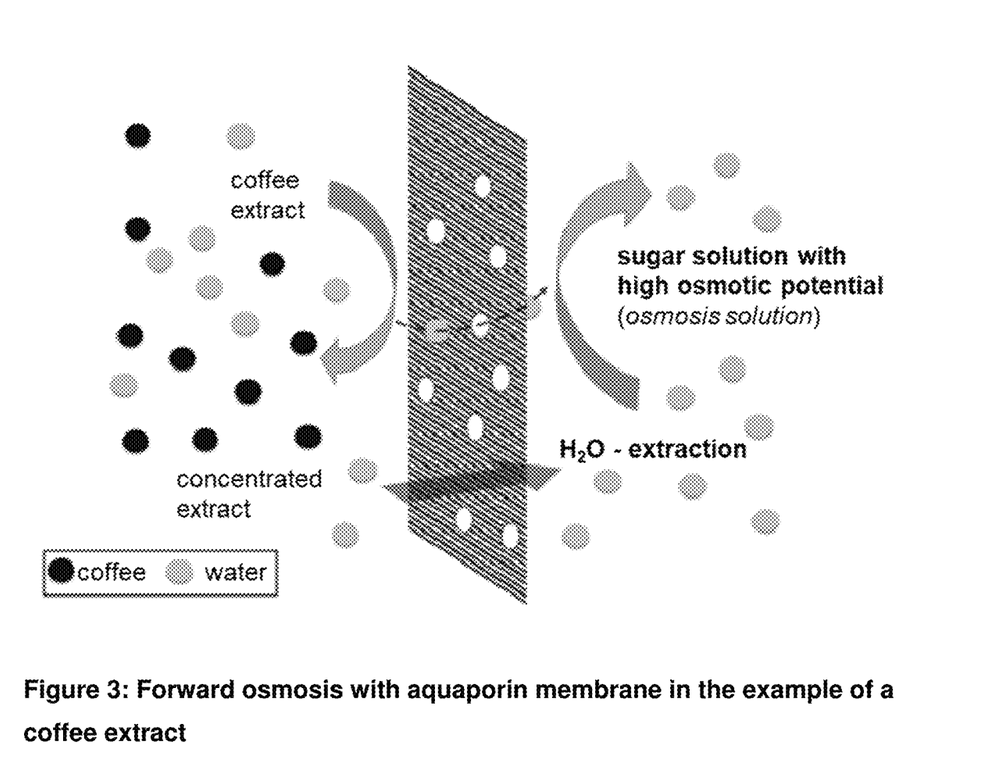
FIG. 3 is a schematic representation of the process according to the invention using the example of a coffee extract FIGS. 4 *a* and 4 *b* are a chromatogram comparison of a tea extract (water phase) and the re-diluted concentrate of the same tea extract

FIG. 3 exemplarily shows the concentration of a coffee extract according to the process of to the invention. The starting product is an aqueous coffee extract. Water is removed from this coffee extract by forward osmosis against a sugar solution with high osmotic potential. During the osmosis process, the water content of the coffee extract is reduced, and a concentrated coffee extract is obtained as retentate, which is removed from the system and further processed in a subsequent step, for example by freeze-drying. Due to the selectivity of the aquaporin membrane for water, only water molecules diffuse through the aquaporin membrane towards the sugar solution. The valuable aroma and flavour substances remain in the coffee extract and are enriched. The sugar solution is diluted by the influx of water.

The biomimetic membrane used is characterized by a high selectivity, which ensures a targeted separation of water while simultaneously retaining the valuable aroma and flavour compounds. Thereby, the valuable aroma and flavour substances remain completely in the water phase (retentate) and do not migrate across the biomimetic membrane to the osmosis solution. In addition, the biomimetic membrane used enables a high flux and thus a short residence time of the starting solution with the sensitive aroma and flavour substances in the plant, which prevents the degradation of the aroma and flavour substances, for example through oxidation.

The semi-permeable biomimetic aquaporin membranes used in the process according to the invention are used either as flat hollow fibre modules or as spiral modules. In a spiral module, the aquaporin membrane is spirally wound, which allows the surface area of the membrane to be increased, which improves the efficiency of the osmosis process. Preferably hollow fibre modules are used in the process according to the invention.

The osmosis process according to the invention is carried out at a pH value of 2 to 10. In addition, the osmosis process according to the invention is carried out at a temperature which has no negative effect on the ingredients, for example aroma and flavour substances, of the aqueous starting solution. Preferably, the process is carried out at a temperature in the range of 10 to 40° C., even more preferably at a temperature of about 25° C.

Preferably, forward osmosis is performed at a flux, i.e. the amount of water flowing through the membrane, of 4 to 30 l/m²h, preferably 10 to 20 l/m²h. The forward osmosis is particularly preferably carried out at a flux of at least 12 l/m²h. This is preferred carried out without pressure.

If the process according to the invention is carried out as reverse osmosis, a pressure of 2 to 15 bar is applied to the aqueous starting solution.

In a further preferred embodiment, the osmosis process according to the invention is carried out continuously. For this purpose, the retentate obtained by membrane filtration, i.e. the food concentrate, is discharged from the system, and in return the permeate is also discharged and replaced by fresh osmosis solution.

With the process according to the invention, a concentration of the aqueous starting solution by a factor of 20 to 1,000, preferably at least by a factor of 100, is achieved.

The aqueous starting solution provided in the first step of the process can be concentrated in an upstream step by conventional process steps such as distillation, adsorption, freeze-drying, membrane filtration or by reverse osmosis or forward osmosis by means of a membrane.

Likewise, the retentate or food concentrate obtained by the osmosis process can be further concentrated in a downstream step by conventional process steps such as distillation, adsorption, freeze-drying, membrane filtration or by reverse osmosis or forward osmosis using a membrane.

Surprisingly, it was found that the process according to the invention for concentrating an aqueous starting solution from a food by osmosis using the above-described biomimetic membrane leads to food concentrates whose sensory profile is identical to the sensory profile of the starting product, i.e. a food concentrate is obtained which has an authentic sensory profile.

The analysis of the sensory valuable components showed that both, volatile odorant substances and non-volatile flavour substances are found in the concentrate in the same quantitative ratio as they were present in the starting solution.

Figure 4A:
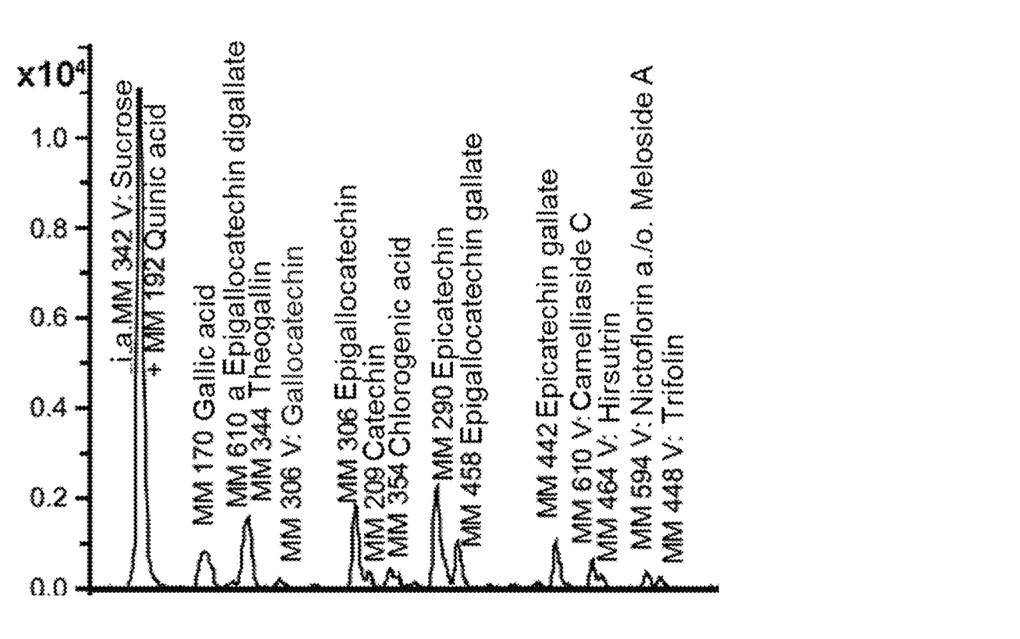
Figure 4B:
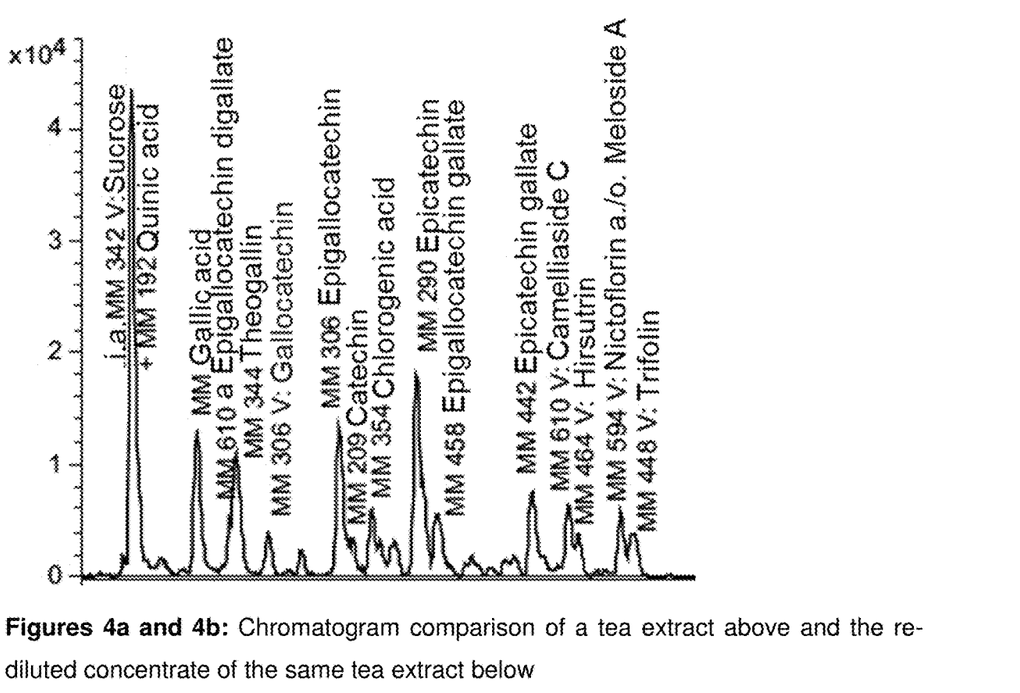

FIG. 4 shows the liquid-chromatographic comparison of non-volatile flavour substances of an aqueous tea extract and the concentrate of the aqueous tea extract obtained by osmosis using a semi-permeable aquaporin membrane. For this purpose, 600 g of black tea was extracted with water at 20 times its weight for two hours. The extract thus obtained was filtered to obtain the starting solution. The starting solution was run by forward osmosis on a 0.6 m² aquaporin membrane module in counterstream to an osmosis solution (draw solution). The extract was concentrated at a flux of initially 13.5 l/m²h from 1.3° Brix to 33° Brix. The comparison in FIG. 3 shows that small flavour molecules such as simple sugars, quinic acid and gallic acid remain in the retentate and are not lost as in adsorptive processes or broken down in distillative processes. The area ratios of the individual value-adding components are almost identical. Caffeine was completely retrieved in the concentrate with >99%.

Water phases from fruit processing, such as citrus fruits, berries, pome fruits, stone fruits, undergo a change in the sensory profile during distillative concentration, which is often described as "cooking note", "less fresh", "potato", "greasy" and "metallic". Surprisingly, it was found that, for example, water phases of yellow peach and strawberry do not experience such a change in profile after concentration with a biomimetic membrane.

Figure 5:
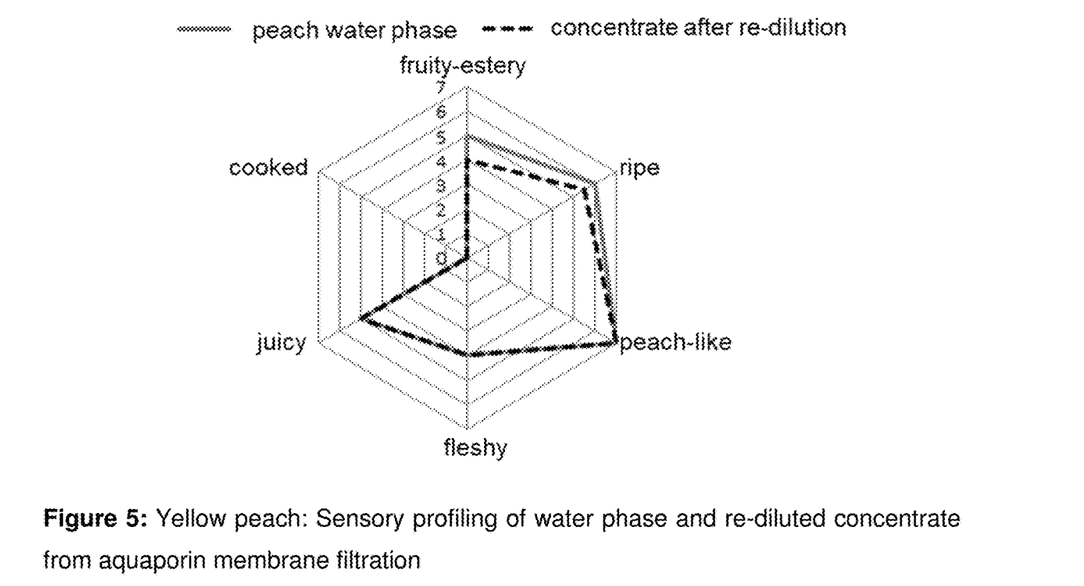
FIG. 5 shows a sensory profiling of water phase and re-diluted concentrate from the aquaporin membrane filtration of yellow peach

The sensory comparison based on a sensory profile according to DIN10967-1-1999, as FIG. 5, shows that the peach-water phase and the concentrate, which has been diluted back to the initial concentration, smell almost identical. Only a slightly less pronounced fruity-estery and ripe note was perceived. The peach-like and fleshy taste notes, which are essentially caused by sulphur-containing components and which are altered in thermal as well as adsorptive processes, are as strongly pronounced in the concentrate as in the water phase.

To create a sensory profile, the descriptive terms (descriptors) are first collected in the panel, whereby the lists of terms are structured, similar terms are combined and hedonic attributes are eliminated. The evaluation of the intensity of the descriptors on a scale of 1-10 is performed by at least ten trained test persons. Thereby, the samples are coded and tasted in a sensory room, in a randomised sequence and excluding disturbing influences such as colour, noise and foreign odours. The final result is determined by summing the individual results and then forming the arithmetic mean and is graphically represented in the form of a network diagram.

TABLE 2

Aroma substances in the water phase and the concentrate of yellow peach

| | Water phase [mg/kg] | Concentrate [mg/kg] | Recovery rate [%] | Molecular weight [Da] |
|---|---|---|---|---|
| ethanol | 379.9 | 10295.5 | 48.7 | 46 |
| ethyl acetate | 41.9 | 621.2 | 90.6 | 88 |
| hexanol | 26.4 | 572.1 | 99.1 | 102 |
| cis-2-hexenol | 19.6 | 408.4 | 98.1 | 100 |
| trans-2-hexenal | 9.9 | 128.0 | 98.8 | 98 |
| cis-3-hexenol | 4.7 | 101.1 | >99.0 | 100 |
| gamma-decalactone | 2.3 | 33.8 | >99.0 | 170 |
| hexanal | 1.7 | 31.0 | >99.0 | 100 |
| 3-methyl-1-butanol | 1.0 | 18.2 | >99.0 | 88 |
| 1,3-pentenol | 0.3 | 7.7 | >99.0 | 86 |

Table 2 shows the contents of valuable aromatic substances in the water phase and the corresponding concentrate of yellow peach. The aqueous starting solution/water phase was obtained by distillation from a vapour condensate so that aroma substances were already enriched. Further concentration was performed by means of the biomimetic aquaporin membrane and shows that at a high water flux of 14 l/m²/h very small molecules are recovered with high yield. The recovery rate of the aroma substances ranged between 90 and >99%. Thermal degradation products of valuable components could not be detected. Instead, it was found that ethanol was removed, which is beneficial to the resulting food concentrate. The recovery rate for ethanol was about 50%.

The strawberry is a particularly suitable system for investigating negative influences of the processing process on the sensory profile, since thermal and pressure-driven influences create cooking notes that remind consumers of "cooked jam". Concentration using a biomimetic aquaporin membrane has surprisingly shown that concentration of the flavour components without negative influence on the sensory profile is possible with almost complete recovery of the flavour components and a high flow rate of the membrane.

TABLE 3

Aroma substances in the water phase and concentrate of strawberry

| | Water phase [mg/kg] | Concentrate [mg/kg] | Recovery rate [%] | Molecular weight [Da] |
|---|---|---|---|---|
| ethyl acetate | 43.1 | 566.8 | 95.0 | 88 |
| trans-2-hexenal | 37.8 | 540.8 | 99.4 | 98 |
| hexanol | 28.3 | 543.6 | >99.0 | 102 |
| methyl butanoate | 18.7 | 245.5 | 99.2 | 102 |
| trans-2-hexenol | 17.3 | 332.6 | >99.0 | 100 |
| gamma-decalactone | 12.0 | 127.3 | >99.0 | 170 |
| ethyl butanoate | 8.4 | 94.3 | >99.0 | 116 |
| hexanoic acid | 6.3 | 84.3 | >99.0 | 116 |
| hexanal | 4.7 | 73.8 | >99.0 | 100 |
| methyl hexanoate | 4.1 | 31.9 | >99.0 | 130 |
| 2-methylbutyric acid | 4.0 | 25.0 | >99.0 | 102 |
| ethyl hexanoate | 1.7 | 7.1 | >99.0 | 144 |
| methyl propionate | 1.3 | 14.2 | >99.0 | 88 |
| butyl acetate | 1.1 | 13.2 | >99.0 | 116 |
| propylacetate | 0.7 | 7.2 | >99.0 | 102 |
| methyl ethyl acetate | 0.6 | 11.0 | >99.0 | 102 |

Table 3 shows the contents of the flavour components in the water phase and the corresponding concentrate of the strawberry. An enrichment factor of 19 was achieved in a short time at high water flux. The recovery rate of the aroma substances ranged between 95 and >99%.

Figure 6:
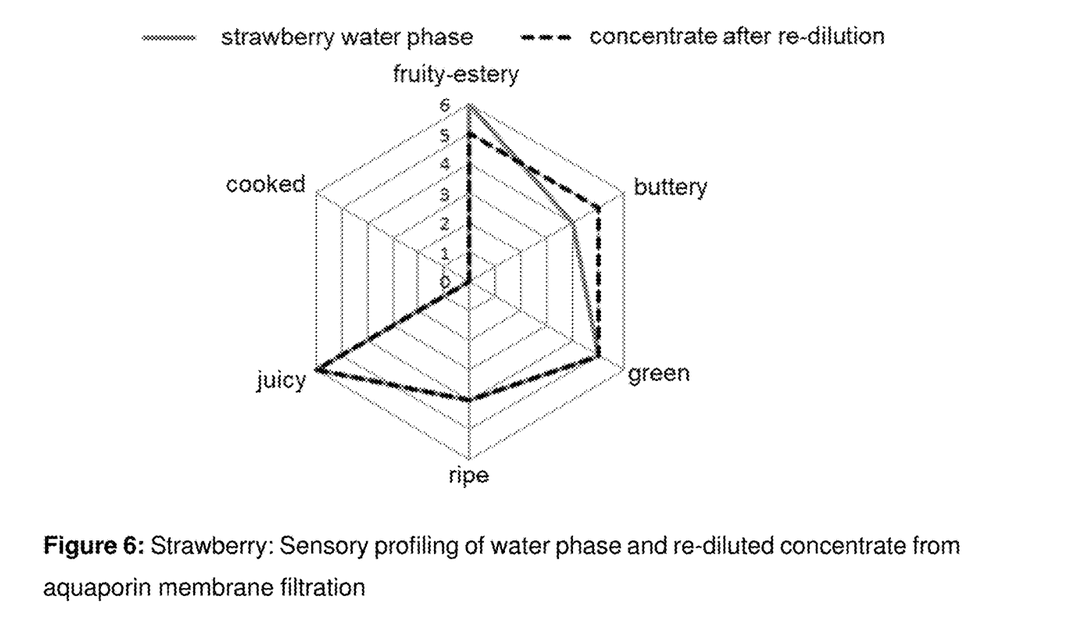
FIG. 6 shows a sensory profiling of water phase and re-diluted concentrate from the aquaporin membrane filtration of strawberry

The sensory comparison in FIG. 6 shows that the aqueous starting solution/water phase and the concentrate, which has been diluted back to the initial concentration, smell almost identical. Merely a slightly less strong fruity-estery note with a slightly increased impression of a buttery note was perceived.

The concentration of vegetable juices such as tomato, cucumber, carrot, celery, beetroot and onion also leads to an undesirable change in the sensory profile using conventional processes known from the state of the art. Surprisingly, it was found that the process according to the invention leads to a concentration without the aforementioned negative influences. For example, 20 kg cucumber juice was obtained from 75 peeled and pureed cucumbers after decanting, centrifugation and bag filtration at a mesh size of 100 μm and concentrated by means of reverse osmosis or the osmosis process according to the invention, respectively. For this purpose, 10 kg of the cucumber water was first dewatered at room temperature and 10 bar by means of a conventional 0.37 m² reverse osmosis membrane module from General Electric for 2.5 hours and at a pressure of 30 bar for a further 3.5 hours at an initial flow of 4 l/m²/h up to a residual quantity of 1640 g. The second half of 10 kg cucumber water was run with a 0.6 m² aquaporin membrane module against 2 kg of a potassium lactate solution as draw solution with a concentration of 60° Brix at 300 ml/min for 5 hours. In the process 1,091 g of product were weighed out. The membrane flux was initially 12 l/m²/h. The osmosis process according to the invention with the biomimetic aquaporin membrane showed a 3-fold higher initial membrane flux and, in the same time, concentrated the cucumber water significantly more than the applied conventional reverse osmosis.

TABLE 4

Aroma substances in cucumber water and the concentrate from reverse osmosis and aquaporin membrane osmosis

| | Cucumber water [mg/kg] | Reverse osmosis [mg/kg] | AQP membrane osmosis [mg/kg] |
|---|---|---|---|
| 6-(Z)-nonenol | 0.600 | 2.823 | 0.148 |
| 2,6-(E,Z)-nonadienol | 0.521 | 0.800 | 0.104 |
| hexanol | 0.210 | 1.085 | 0.138 |
| 2,6-(E,Z)-nonadienal | 0.078 | 0.886 | 2.610 |
| 2-(E)-nonenal | 0.039 | 0.428 | 0.715 |
| 8,11,14-(Z,Z,Z)-heptadecatrienal | 0.025 | 0.247 | 0.769 |
| 2-(E)-hexenal | 0.007 | 0.078 | 0.296 |
| hexanal | 0.003 | 0.074 | 0.773 |
| 2,6-(E,E)-nonadienal | <0.002 | 0.035 | 0.042 |
| 2-(E)-octenal | <0.002 | <0.002 | 0.039 |
| 2,4-(E,E)-decadienal | <0.002 | <0.002 | 0.061 |
| 8,11-(Z,Z)-heptadecadienal | <0.002 | <0.002 | 0.604 |

Reverse osmosis is industrially considered to be the standard process for non-thermal and thus gentle concentration by dewatering the used juice/aqueous starting solution.

However, the comparison presented in Table 4 shows that the value-giving aldehydes in cucumber such as 2,6-(E,Z)-nonadienal and 2-(E)-hexenal are degraded by reverse osmosis and alcohols are formed, while in the osmosis according to the invention by means of the biomimetic aquaporin membrane, the aldehydes dominate in terms of quantity and are thus retained. The experiment has surprisingly shown that the concentrate from the process according to the invention had an intensive smell of freshly cut cucumber and the already brownish coloured concentrate from reverse osmosis smelled greenish, balsamic, like cooked cucumber. In addition, the draw solution of the osmosis with the biomimetic aquaporin membrane was odourless, while the permeate of the reverse osmosis had slight greenish notes. Further osmosis experiments with classical membranes known from the state of the art showed, as with reverse osmosis, that losses of taste components occur with classical membranes. The biomimetic membrane used in accordance with the process according to the invention thus shows a high selectivity, which enables a targeted separation of water while retaining the valuable flavour components, with a high flux at the same time and thus a short residence time of the sensitive flavour components in the plant.

Surprisingly, no degradation products or disturbing degradation products of the valuable components were detected in the described experiments and sensory disturbing components were not detected either. The disturbing components are particularly those compounds that are formed in state-of-the-art distillation concentration processes, for example due to thermal degradation, pH shift, oxidation or chemical rearrangement reactions, and that influence the sensory profile of the food concentrate.

Aroma substances which, depending on the foodstuff and concentration, have a negative influence on the aroma profile and that are the result of process-related physical and chemical degradation are listed in Table 5 below:

TABLE 5

Influence of the membrane process on odour and taste components

| Food | Process-related loss | Formation of disturbing component(s) |
|---|---|---|
| Pineapple | 4-hydroxy-2,5-dimethyl-3(2H)-furanone, ethyl-2-methylbutanoate | methional, 2,4-(E,E)-decadienal |
| Apple | 2-(E)-hexenal, cis-3-hexenol, hexanal, ethyl butanoate, 2-methyl butyl acetate | 2-3-methylbutyraldehyde, furfural, 1,3-pentanal, 3,5-octadienal, linalooloxide, 8-p-cymenol |
| Beer | isoamyl acetate, 3-methylbutanol, linalool, myrcene, phenylethanol, ethyl butanoate | trans-2-nonenal, dimethyl sulfide |
| Citrus fruits | acetaldehydes, cis-3-hexenal, hexanal, ethyl butanoate | α-terpineol, p-dimethylstyrene, limonene epoxide, carveol, carvone, 4-vinylguaiacol |
| Strawberry | acetaldehydes, methyl butanoate, ethyl-2-methyl butanoate, cis-3-hexenal, hexanal | β-damascenone, 2,4-(E,E)-decadienal, furfural, guaiacol |
| Coffee | methanethiol, dimethyl sulfides, methyl propanal, 2,3-butanedione, 2-furfuryl thiol | bis-(2-furfuryl)disulfide, 2-(2-furyl)methylthio-hydroxy-1,4-dihydro-pyrazine |
| Milk | diacetyl, 2-methylbutanol, cis-4-heptenal, trans-2-nonenal, 1-octen-3-one, 1-octen-3-ol | dimethyl sulfide, dimethyl disulfide, 2-hexanone, 2-heptanone, 2,3-methylbutanal |
| Passion fruit | acetaldehydes, hexanal, ethyl butyrates, linalool | benzaldehyde, α-terpineol, furfural, acetic acid, acetophenone, β-ionone, linalooloxide |
| Tea | cis-3-hexenal, cis-3-heptenal, linalool, 3-methyl-2,4-nonandione, 2,3-methylbutyric acid, 1,5-octadien-3-one | β-damascenone, 2,4-(E,E)-decadienal, 3-hydroxy-4,5-dimethyl-2(5H)-furanone, 4-hydroxy-2,5-dimethyl-3(2H)-furanone |
| Tomato | cis-3-hexenol, cis-3-hexenal, trans-2-hexenal, hexanal, β-ionone, 2-isobutylthiazole | Dimethyl disulfide, methional, 4-hydroxy-2,5-dimethyl-3(2H)-furanone |
| Onion juice | propanal, hexanal, trans-2-heptenal, dipropyl disulfide, dipropyl trisulfide, methyl propyl disulfide | dimethyl trisulfide, dipropyl trisulfide, dimethyl tetrasulfide, 3,5-diethyl-1,2,4-trithiolane, thiophene |

Concentration of the foods listed in Table 5 using the process described according to the invention results in a significantly more authentic sensory profile than with conventional distillation, adsorption and membrane processes known from the state of the art. In particular, no process-related losses of aroma substances occur and no disturbing components are formed which alter the sensorial profile.

A further advantage of the process according to the invention is that, compared to conventional thermal, e.g. distillative processes, it is particularly suitable for concentrating thermolabile foods or foods with thermolabile ingredients, since it can be carried out at low temperatures, preferably at 25° C., and thus food concentrates can be obtained whose flavour and aroma are not affected by heat.

The concentrates obtained by the process according to the invention are also characterized in that they do not contain any solvent additives. In contrast to the conventional adsorption processes known from the state of the art for the concentration of aqueous starting solutions from a food, no solvents are used in the process according to the invention; therefore no solvent residues are found in the food concentrate obtained. Thereby, at the same time, solvent-related precipitation reactions and discolorations are avoided, so that clear, non-clouded food concentrates are obtained. Solvents which are typically used in such adsorption processes to obtain the aroma concentrate from food are acetone, butane, butan-1-ol, butan-2-ol, cyclohexane, dinitrogen monoxide, diethyl ether, ethyl acetate, ethanol, ethyl methyl ketone, hexane, methanol, methyl acetate, propane, propan-1-ol and propan-2-ol and which do not originate from the food.

The present invention thus also refers to a food concentrate which is obtainable by the method described above.

In an even more preferred embodiment, the food concentrate is an aroma substance concentrate.

As described in detail above, the food concentrate according to the invention does not have any off-flavour. Off-flavour is the recognized and used technical term for aroma defects. Aroma defects are caused due to the additional presence of an otherwise absent aroma component in the affected food, the loss of one or more characteristic compound(s) (impact compounds) or a shift in concentration between the individual aroma components.

As can be seen from the detailed description above, the present invention also refers to a food concentrate, in which the sensory profile of a re-diluted concentrate from the osmosis according to the invention with the semi-permeable biomimetic membrane differs from the sensory profile of an aqueous starting solution on a scale of 0 to 10 points in the 6 taste axes of a conventional panel profile by a total of max. of 1 point, whereby the sensory profile is measured via a test panel according to DIN 10967-1-1999, or according to the protocol according to the invention described below.

To create a sensory profile, the descriptive terms (descriptors) are first collected in the panel, whereby the lists of terms are structured, similar terms are combined and hedonic attributes are eliminated. The evaluation of the intensity of the descriptors on a scale of 1-10 is performed by at least ten trained test persons. Thereby, the samples are tasted in a sensory room coded, in a randomised sequence and excluding disturbing influences such as colour, noise and foreign odours. The final result is determined by summing the individual results and then forming the arithmetic mean and is graphically represented in the form of a network diagram.

As can be seen from FIGS. 5 and 6, the sensory profile of the concentrate after re-dilution, which was obtained according to the process according to the invention, differs from the sensory profile of the aqueous starting solution (water phase) of yellow peach and strawberry in the corresponding 6 taste axes by a maximum of 1 point each.

As can be further seen from the above analyses, in the food concentrate according to the invention, the recovery rate of the aroma substances, which have an OAV (odour activity value) ≥1 in the aqueous starting solution, is >90%, preferably >98%, in particular >99%, in the retentate relative to the aqueous starting solution. As clearly shown in Tables 2 to 5, the concentration of the respective aqueous starting solution according to the invention leads to a concentration of the flavour components without negative influence on the sensory profile with an almost complete recovery of the flavour components, whereby an authentic sensory profile is obtained.

The OAV value is defined as a measure of the significance of a specific component in the odour of a sample, for example, a foodstuff. The OAV value is calculated by dividing the concentration of a specific substance in the food (mg/kg) by the concentration threshold value of this substance in the food (mg/kg). If the OAV>1, the concentration of the substance exceeds the odour threshold concentration and the substance then makes a sensorial contribution to the overall profile. Substances with an OAV <1 therefore do not contribute to the sensory profile.

The process according to the invention can also be used to provide concentrates that stand out. These are characterized by a higher authenticity in taste and smell, since odour-active substances are preserved in the process. It was found that the food concentrates can be represented by the following relationship: the food concentrate according to the invention is thus characterized in that the aroma substances, i.e. the odour active substances, in the food concentrate with a parameter W (log of the sensory recovery coefficient), which is preferably >−3, even more preferably >−5, relative to the aqueous starting solution, has a recovery rate of ≥50%, preferably of ≥70%. Thereby, a recovery rate of ≥90% or ≥95% is particularly preferred, and most preferably a recovery rate of ≥98% or ≥99%.

The sensory recovery coefficient (SWF) of an aroma substance is composed of the log P of the aroma substance and the odour threshold concentration of the aroma substance (mg/kg in water) and is defined as follows:

$$\text{Sensory recovery coefficient } SWF = \frac{10^{\wedge}\log P}{\text{Odour threshold concentration}\left(\frac{mg}{kg}\right)}$$

The log P value in turn is defined as follows:

$$\log P = \log K(n-\text{octanol}/\text{water}) = \frac{Cn - \text{Octanol}}{CWater},$$

wherein:
C (n-octanol) is the concentration of the aroma substance in the n-octanol phase; and
C (water) is the concentration of the aroma substance in the water phase.

The log K(n-octanol/water) is a dimensionless partition coefficient which indicates the ratio of the concentration of the aroma substance in a two-phase system of n-octanol and water. It is thus a model measure of the polarity or water/fat solubility of the aroma substance.

Log P is a common physical parameter and is positive for lipophilic aroma substances and negative for hydrophilic aroma substances.

The W parameter is therefore defined as follows:

$$W = \log_{10}(SWF)$$

The W parameter is thus an absolute value of the respective substance which, taking into account the sensory activity of the substances, allows discrimination according to the invention.

The log P, odour threshold values and sensory recovery coefficients of aroma substances are given in Table 6 below:

TABLE 6

| Odour threshold values and sensory recovery coefficients | | | | |
|---|---|---|---|---|
| Compound | logP | Threshold [mg/kg in water] | Sensory recovery coefficient (SWF) | W = log (SWF) |
| methanol | −0.358 | 369828 | 1.18577E−06 | −5.93 |
| ethanol | −0.19 | 52000 | 1.24164E−05 | −4.91 |
| propanol | 0.5145 | 5700 | 0.000573621 | −3.24 |
| hexanol | 1.8831 | 50 | 1.528023367 | 0.18 |
| Z-3-hexenol | 1.4385 | 13 | 2.111332572 | 0.32 |
| acetaldehyde | −0.1825 | 63 | 0.010427002 | −1.98 |
| propanal | 0.4844 | 170 | 0.017945315 | −1.75 |
| 2-methylbutyraldehyde | 1.4031 | 0.9 | 28.10978284 | 1.45 |
| hexanal | 1.853 | 16 | 4.455331438 | 0.65 |
| acetic acid | −0.2299 | 180000 | 3.27211E−06 | −5.48 |
| butyric acid | 0.8932 | 1000 | 0.007819878 | −2.11 |
| hexanoic acid | 1.8056 | 3944 | 0.016205525 | −1.79 |
| ethyl acetate | 0.73 | 3125 | 0.001718502 | −2.76 |
| ethyl butanoate | 1.493 | 1 | 31.11716337 | 1.49 |
| ethyl hexanoate | 2.4054 | 5 | 50.86628212 | 1.71 |
| 2,3-butanedione | −0.5078 | 54 | 0.005751833 | −2.24 |
| 2,3-pentanedione | 0.1591 | 5 | 0.28848949 | −0.54 |

TABLE 6-continued

Odour threshold values and sensory recovery coefficients

| Compound | logP | Threshold [mg/kg in water] | Sensory recovery coefficient (SWF) | W = log (SWF) |
|---|---|---|---|---|
| gamma-octalactone | 2.0901 | 24 | 5.127300347 | 0.71 |
| linalool | 2.7354 | 103 | 5.279135088 | 0.72 |
| geranial | 3.1904 | 320 | 4.84451184 | 0.68 |

Odour active substances with a log of the sensory recovery coefficient W of the aroma substances >−3 are well retained in the retentate by the biomimetic membrane, irrespective of their size, molecular weight and chemical structure, which is why the concentrates obtained have a very authentic and almost congruent sensory profile relative to the aqueous starting solution. Methanol and ethanol partially migrate through the aquaporin water channels due to their polar structure; however, these substances are only of minor relevance for the sensory profile due to their high threshold value.

According to the invention, a food concentrate in which the ethanol content is reduced by at least 50%, relative to the aqueous starting solution, is particularly preferred. The advantage of the process according to the invention is therefore a strong reduction of ethanol, with simultaneous strong retention of the characteristic aroma substances. This allows concentrates to be sold even in countries that have cultural-related reservations about ethanol. Even more preferred the recovery rate of ethanol is according to the present process <90%, even more preferred <99%, so that the ethanol content can be significantly reduced without losing the characteristic taste of the starting solution.

Preferably the recovery rate of the aroma and flavour substances with a molecular weight of 40 to 300 Da, preferably 86 to 170 Da, in the retentate is >90% relative to the aqueous starting solution, even more preferably the recovery rate of the aroma substances with a molecular weight of 98 to 200 Da is >98%.

Another particular advantage of the food concentrate according to the invention is that it is free from solvent additives, in particular free from solvent additives selected from the group consisting of: acetone, butane, butan-1-ol, butan-2-ol, cyclohexane, dinitrogen monoxide, diethyl ether, ethyl acetate, ethanol, ethyl methyl ketone, hexane, methanol, methyl acetate, propane, propan-1-ol and propan-2-ol. The above-mentioned solvent additives are such solvents which are used in conventional adsorptive processes for elution/desorption of the valuable aroma and flavour substances and thus for obtaining the aroma concentrate and which do not originate from the native food. These solvents remain as residues in the aroma concentrate and are partly toxicologically questionable.

A further advantageous property of the food concentrate according to the invention is that it is free of disturbing aroma components, preferably that the food concentrate is free of disturbing aroma components with an OAV (odour activity value) ≥1 that alter the sensory profile.

The disturbing components are in particular those compounds which are formed in conventional osmosis processes with known membranes or in distillative processes for obtaining the aroma concentrate, for example by thermal degradation, pH shift, oxidation or chemical rearrangement reactions, and which thus influence the sensory profile of the food concentrate. Such disturbing components formed by thermal degradation of food ingredients, e.g. in the conventional distillation processes for obtaining the aroma concentrate, may negatively alter the sensory profile of the obtained food concentrate.

Such disturbing components are preferred:
For pineapple: methional, 2,4-(E,E)-decadienal
For apple: 2,3-methylbutyraldehyde, furfural, 1,3-pentanal, 3,5-octadienal, linalooloxide, 8-p-cymenol
For beer: trans-2-nonenal, dimethyl sulfide
For citrus fruits: α-terpineol, p-dimethylstyrene, limonene epoxide, carveol, carvone, 4-vinylguaiacol
For strawberry: β-damascenone, 2,4-(E,E)-decadienal, furfural, guaiacol
For coffee: bis-(2-furfuryl)disulphide, 2-(2-furyl)methyl-thio-hydroxy-1,4-dihydro-pyrazine
For milk: dimethyl sulfide, dimethyl disulfide, 2-hexanone, 2-heptanone, 2,3-methylbutanal
For passion fruit: benzaldehyde, α-terpineol, furfural, acetic acid, acetophenone, β-ionone, linalooloxide
For tea: β-damascenone, 2,4-(E,E)-decadienal, 3-hydroxy-4,5-dimethyl-2(5H)-furanone, 4-hydroxy-2,5-dimethyl-3(2H)-furanone
For tomato: dimethyl disulfide, methional, 4-hydroxy-2,5-dimethyl-3(2H)-furanone
For onion juice: dimethyl trisulfide, dipropyl trisulfide, dimethyl tetrasulfide, 3,5-diethyl-1,2,4-trithiolane, thiophene In a further preferred embodiment, the food concentrate according to the invention is free of disturbing aroma components with an OAV (odour activity value) ≥1 and/or does not contain any solvent additives. Even at a concentration of at least 100 times, in particular 200 to 1,000 times, the food concentrate in accordance with the invention is free of disturbing aroma components with an OAV (odour activity value) ≥1 and/or does not contain any solvent additives. Accordingly, the food concentrate according to the invention is at least 100-fold, in particular 200 to 1,000-fold.

In this food concentrate, the disturbing components are preferably as defined above and, depending on the starting solution, none of the above defined disturbing components are contained in the respective food starting solutions in such quantities that are odour active. Furthermore, no solvent additives are contained which are usually used as eluants in adsorptive concentration processes. This food concentrate is therefore unique in taste and composition at these concentration ratios, e.g. at a concentration of the aroma substances of 1000 to 10000 ppm. These food concentrates generally have less browning and fewer precipitation reactions.

The food concentrate according to the invention is preferably a concentrate which is prepared from one or more of the following foods: fruit juices such as pineapple juice, apple juice, aronia juice, citrus fruit juice, strawberry juice, passion fruit juice and pear juice; vegetable juices such as cucumber juice, carrot juice, asparagus juice, tomato juice, onion juice; pressed juices of basil, kiwi, mango, parsley, celery, spinach; aqueous extracts of hibiscus, elderberry, coffee, mint, tea, spices such as ginger and herbs such as dill; animal-based foods such as milk, or alcohol-containing foods such as beer and wine.

The food concentrate according to the invention can be used for aromatising or reconstituting the aroma of foods, beverage products, semi-finished products, oral hygiene products, cosmetic or pharmaceutical products.

A further aspect of the present invention is therefore also food or beverages comprising the food concentrate according to the invention, advantageously in an amount of 0.1 to 1% by weight. The foods to which the food concentrate according to the invention is preferably added are selected from the group consisting of beverages, dairy products, sweets, food supplements, dietary foods and food surrogates.

EXAMPLES

The process of the present invention and the food concentrates obtained by this process are now described in more detail with reference to the individual examples.

In general, the following implementation parameters are used unless explicitly stated otherwise in the examples:
Procedural details for the operation of the aquaporin membrane module:
  Module design: polycarbonate tube, 23 cm long and 5 cm in diameter, interspersed with hollow fibres (so-called hollow fibre module)
  Flux: at least >12 l/m$^2$/h
  pH: 2 to 11
  Temperature: max. 50° C.
  Unpressurized at a flow of max. 18 l/h of the water phase and max. 18 l/h of the osmosis solution for a 0.6 m$^2$ module
  4 M NaCl as osmosis solution

Example 1: Preparation of a Cucumber Juice Concentrate

| Product: | Cucumber juice, freshly juiced | |
| --- | --- | --- |
| Starting materials: | 10 000 g | Cucumber juice, water phase |
| | 2 000 g | Osmosis solution 60° Brix potassium lactate |

Concentration of the Aroma Substances by a Factor of 20
  Apparatus: Forward osmosis module of aquaporin LHF033 combined with 10 litre-tank from Sartorius+2 Ismatec pumps
  Membrane: FO Module Aquaporin LHF033, 0.6 m$^2$ active membrane area
  Experimental procedure: The cucumber juice as well as the draw solution were pre-filtered through 100 μm bag filters due to solid and suspended matter contained. The feed tank was filled with 10 kg cucumber juice and 2.0 kg of draw solution (osmosis solution) was added to the canister. The feed pump and the draw solution pump were then started with a flow of 300 ml/min each. The experiment was stopped after 9 kg had been removed. The feed tank is rinsed with 2 kg of distilled water. The rinsing water is also passed on for analysis.
Weigh Outs:
  Output: 10 000 g
  Permeate: 8 835 g
  Retentate: 1 091 g
  Rinsing water (output weight): 2 004 g
  Draw Solution Start: 60° Brix
  Draw Solution End: 12.4° Brix
  Temperature: 25° C.
Recording of the Data:

| Time (min) | 0 | 15 | 30 | 60 | 90 | 120 | 150 |
| --- | --- | --- | --- | --- | --- | --- | --- |
| Quantity of the added product (g) | 10 000 | | | | | | |
| Quantity of the added draw solution (kg) | 2.0 | | | | | | |
| Weight draw solution (kg) | 0 | 2.013 | 3.352 | 5.150 | 6.352 | 7.227 | 7.912 |
| Flux (l/m$^2$ · h) | | | 11.7 | 8.6 | 7.1 | 6.0 | 5.3 |

| Time (min) | 180 | 210 | 240 | 270 | 300 |
| --- | --- | --- | --- | --- | --- |
| Weight draw solution (kg) | 8.385 | 8.629 | 8.753 | 8.810 | 8.835 |
| Flux (l/m$^2$ · h) | 4.7 | 4.1 | 3.6 | 3.3 | 2.9 |

Example 2: Preparation of a Yellow Peach Concentrate

| Product: | Yellow peach, pure extract | |
| --- | --- | --- |
| Starting materials: | 10 000 g | Yellow peach, water phase |
| | 2 000 g | Osmosis solution 60° Brix potassium lactate |

Concentration of the Aroma Substances by a Factor of 20
  Apparatus: Forward osmosis module of Aquaporin LHF033 combined with 10 litre-tank from Sartorius+2 Ismatec pumps
  Membrane: FO Module Aquaporin LHF033, 0.6 m$^2$ active membrane area
  Experimental procedure: The feed tank was filled with 10,000 g of water phase. 2.0 kg draw solution (60° Brix) was added to the canister. Then the feed pump and the draw solution pump were started with a flow of 300 ml/min each.
Weigh Out:
  Output: 10 000 g
  Retentate: 413.5 g
  Permeate: 9 500 g Draw Solution Start: 60° Brix
Draw Solution End: 12.6° Brix
Temperature: 25° C.
Recording of the Data:

| Time (min) | 0 | 15 | 30 | 60 | 116 End |
|---|---|---|---|---|---|
| Quantity of the added product (g) | 10 000 | | | | |
| Quantity of the added draw solution (kg) | 2.0 | | | | |
| Weight draw solution (kg) | 0 | 2.100 | 3.890 | 6.500 | 9.500 |
| Flux (l/m² · h) | | 14.0 | 11.9 | 8.7 | 5.4 |

The sensory profile is as follows:

| | Intensity: 1-10 | |
|---|---|---|
| | Start Yellow peach, water phase | Concentrate after re-dilution |
| Fruity-estery | 5 | 4 |
| Ripe | 6 | 5.5 |
| Peach-like | 7 | 7 |
| Fleshy | 4 | 4 |
| Juicy | 5 | 5 |
| Cooked | 0 | 0 |

The sensory profile is shown in FIG. 5.

Example 3: Preparation of a Strawberry Concentrate

| Product: | Water phase from the strawberry juice concentration |
|---|---|
| Starting materials: | 10 000 g Strawberry, water phase |
| | 2 000 g Osmosis solution 60° Brix potassium lactate |

Concentration of the Aroma Substances by a Factor of 20
  Apparatus: Forward osmosis module of Aquaporin LHF033 combined with 10 litre-tank of Sartorius+2 Ismatec pumps
  Membrane: FO Module Aquaporin LHF033, 0.6 m² active membrane area
  Experimental procedure: The feed tank was filled with 10,000 g water phase and 2.0 kg draw solution (60° Brix) was added to the canister. Then the feed pump and the draw solution pump were started with a flow of 300 ml/min each.
Weigh Out:
  Output: 10 000 g
  Retentate: 510.0 g
  Permeate: 9 500 g
  Draw Solution Start: 60° Brix
  Draw Solution End: 12.4° Brix
  Temperature: 25° C.
Recording of the Data:

| Time (min) | 0 | 15 | 30 | 60 | 90 |
|---|---|---|---|---|---|
| Quantity of the added product (g) | 10 000 | | | | |
| Quantity of the added draw solution (kg) | 2.0 | | | | |
| Weight draw solution (kg) | 0 | 1.890 | 3.638 | 6.054 | 7.990 |
| Flux (l/m² · h) | | 12.6 | 11.7 | 8.1 | 6.5 |

| Time (min) | 120 | 123 End |
|---|---|---|
| Quantity of the added product (g) | | |
| Quantity of the added draw solution (kg) | | |
| Weight draw solution (kg) | 9.440 | 9.500 |
| Flux (l/m² · h) | 4.8 | 4.0 |

The sensory profile is as follows:

| | Intensity: 1-10 | |
|---|---|---|
| | Start Strawberry, water phase | Concentrate after re-dilution |
| Fruity-estery | 6 | 5 |
| Buttery | 4 | 5 |
| Green | 5 | 5 |
| Ripe | 4 | 4 |
| Juicy | 6 | 6 |
| Cooked | 0 | 0 |

The sensory profile is shown in FIG. 6.

Example 4: Preparation of a Concentrate of Black Tea, Ceylon

| Product: | Black tea from Ceylon |
|---|---|
| Starting materials: | 600 g Tea |
| | 12 000 g Water |
| | 2 000 g Osmosis solution 60° Brix potassium lactate |

Concentration of the Aroma Substances by a Factor of 20
  Apparatus: Forward osmosis module of Aquaporin LHF033 combined with 10 litre-tank from Sartorius+2 Ismatec pumps
  Membrane: FO Module Aquaporin LHF033, 0.6 m² active membrane area
  Experimental preparation: 600 g of tea were extracted for 2 hours at room temperature in 12 kg of water, then suspended solids were removed via sieve and folded filter. 10 kg of the water phase were used for forward osmosis.
  Experimental procedure: The feed tank was filled with 10 000 g water phase and 2.0 kg draw solution (60° Brix) was added to the canister. Then the feed pump and the draw solution pump were started with a flow of 300 ml/min each.
Weigh Out:
  Output: 10 000 g, 1.3° Brix
  Retentate: 278.1 g, 33.1° Brix
  Permeate: 9 602 g
  Draw Solution I Start: 60° Brix
  Draw Solution II Start: 60° Brix
  Draw Solution End: 18.4° Brix
  Draw Solution II End: 21.9° Brix Recording of the Data:

| Time (min) | 0 | 15 | 30 | 60 | 120 |
|---|---|---|---|---|---|
| Quantity of the added product (g) | 10,000 | | | | |
| Quantity of the added draw solution (kg) | 2.0 | | | | |
| Weight draw solution (kg) | 0 | 2.028 | 2.880 | 3.760 | 4.744 |
| Flux (l/m² · h) | | 13.5 | 5.7 | 2.9 | 1.6 |

| Time (min) | 180 | 240 | 300 | 344 |
|---|---|---|---|---|
| Quantity of the added product (g) | | | | |
| Quantity of the added draw solution (kg) | | 2.0 | | |
| Weight draw solution (kg) | 5.569 | 2.068 | 3.510 | 4.033 |
| Flux (l/m² · h) | 1.3 | 7.6 | 2.4 | 1.2 |

The invention claimed is:

1. A process for preparing a food concentrate comprising:
    preparing an aqueous starting solution from a food, wherein the aqueous starting solution is a vapor condensate obtained from a fruit or a vegetable,
    concentrating the aqueous starting solution by forward osmosis with a semi-permeable biomimetic membrane, and
    thereby forming a food concentrate as a retentate;
    wherein the semipermeable biomimetic membrane comprises:
        vesicles of liposomes comprising at least one aquaporin protein incorporated therein or vesicles of polymersomes comprising at least one aquaporin protein incorporated therein;
        a thin film composite matrix in which the vesicles are embedded; and
        a carrier layer;
    wherein the osmosis is carried out at a temperature in a range of 10° C. to 40° C.; and
    wherein the aqueous starting solution is concentrated by a factor of 20 to 1000.

2. A process according to claim 1, wherein the liposome comprises lipids selected from DPhPC, DOPC, mixed soybean lipids, asolectin, mixed lipids of *E. coli*, or combinations thereof; and wherein the polymersome comprises: triblock copolymers of the hydrophilic-hydrophobic-hydrophilic-type (A-B-A, A-B-C, C-B-A, wherein A is PMOXA, B is PDMS and C is PEO), diblock copolymers of the hydrophilic-hydrophobic type (A-B, wherein A is PB and B is PEO), or combinations thereof.

3. A process according to claim 1, wherein the aquaporin protein comprises at least one selected from the group consisting of AQP0, AqpZ, SoPIP2, AQP10, and their isoforms.

4. A process according to claim 1, wherein the thin film composite matrix is prepared by polymerizing an aqueous solution of an amine with a solution of an acid chloride in an organic solvent.

5. A process according to claim 1, comprising recovering in the retentate aroma substances having an OAV (odour activity value) ≥1 in the aqueous starting solution wherein a recovery rate of the aroma substances having an OAV ≥1 in the aqueous starting solution is >90% in the retentate, by weight relative to the aroma substances having an OAV ≥1 in the aqueous starting solution.

6. A process according to claim 1, comprising recovering in the retentate aroma substances having a log-sensory recovery coefficient W>3 in the aqueous starting solution wherein the recovery rate of aroma substances having log-sensory recovery coefficient W of the aroma substances with W>−3, is ≥50%; by weight relative to the aroma substances having a log-sensory recovery coefficient W>−3 in the aqueous starting solution.

7. A process according to claim 1, wherein the aqueous starting solution comprises ethanol, and wherein any remaining ethanol content in the retentate is reduced by at least 50%, by weight relative to the ethanol content in the aqueous starting solution.

* * * * *

UNITED STATES PATENT AND TRADEMARK OFFICE
CERTIFICATE OF CORRECTION

PATENT NO. : 12,268,227 B2
APPLICATION NO. : 16/762887
DATED : April 8, 2025
INVENTOR(S) : Johannes Kiefl et al.

Page 1 of 1

It is certified that error appears in the above-identified patent and that said Letters Patent is hereby corrected as shown below:

In the Claims

Column 24, Line 28, Claim 6, "W>3" should be -- W>–3 --.

Column 24, Line 31, Claim 6, "≥50%;" should be -- ≥50% --.

Signed and Sealed this
Thirtieth Day of September, 2025

John A. Squires
*Director of the United States Patent and Trademark Office*